Feb. 9, 1937.  W. J. PASINSKI  2,070,061
CASH REGISTER
Filed Sept. 15, 1933   8 Sheets-Sheet 1

INVENTOR
Walter J. Pasinski
BY
Reston, Hibben, Davis + Macauley
ATTORNEYS

Feb. 9, 1937.  W. J. PASINSKI  2,070,061
CASH REGISTER
Filed Sept. 15, 1933  8 Sheets-Sheet 2

INVENTOR
Walter J. Pasinski
BY
Rector, Hibben, Davis & Macauley
ATTORNEYS

Feb. 9, 1937. W. J. PASINSKI 2,070,061
CASH REGISTER
Filed Sept. 15, 1933  8 Sheets-Sheet 7

INVENTOR
Walter J. Pasinski
BY
Rector, Hibben, Davis + Macauley
ATTORNEYS

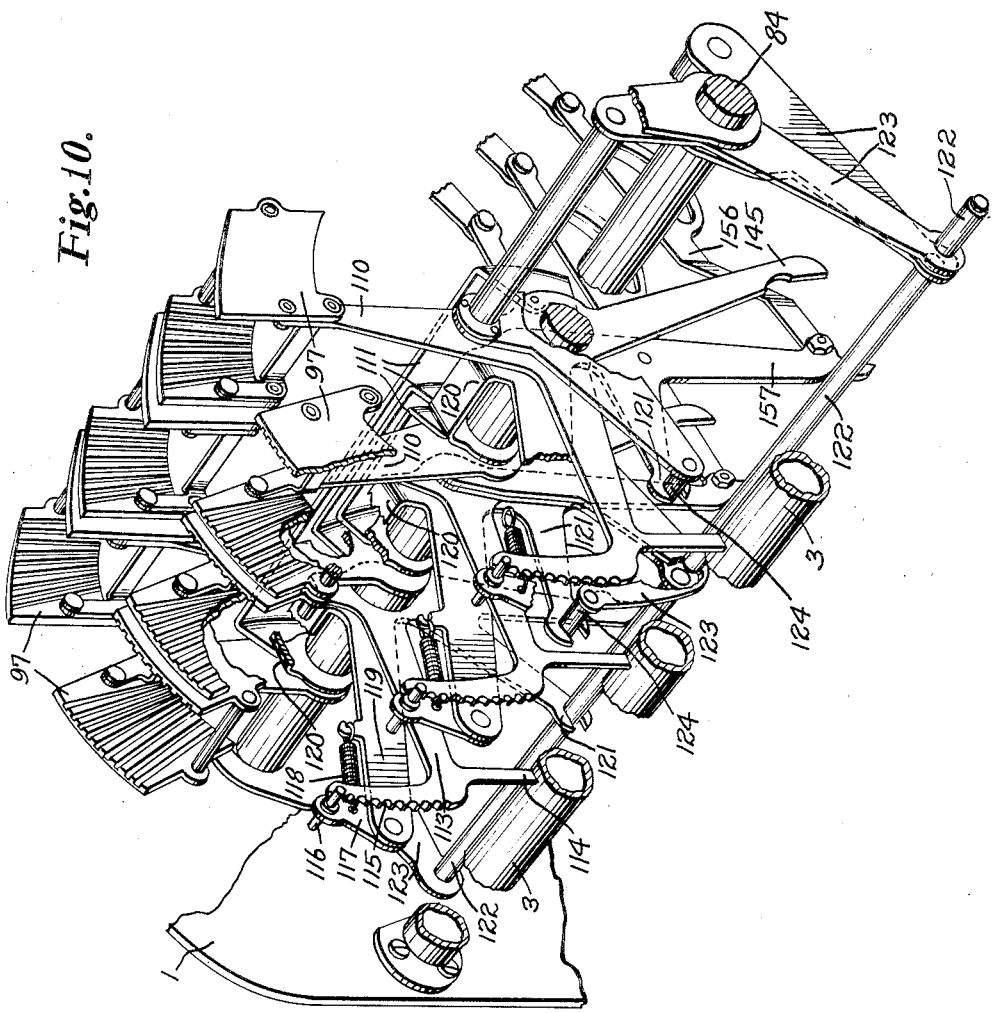

Patented Feb. 9, 1937

2,070,061

UNITED STATES PATENT OFFICE 2,070,061

CASH REGISTER

Walter J. Pasinski, Howell, Mich., assignor to Burroughs Adding Machine Company, Detroit, Mich., a corporation of Michigan Application September 15, 1933, Serial No. 689,658

36 Claims. (Cl. 235—23)

This invention relates to cash registers and more particularly to an indicator mechanism therefor.

It is desirable to have an indicating mechanism that is readable from left to right from either front or rear of the cash register. The provision of such an indicating mechanism, however, involves other problems than just the mere arrangement of the tabs. Space is one such problem, the simultaneous control and operation of the tabs which are reversely positioned is another, reduction of key load is another, and many other difficult situations creep in.

Furthermore, it is sometimes desirable to have a cash register without a visual indicator. It is therefore desirable from a manufacturer's viewpoint to have a machine that is readily convertible to either type of machine.

In many instances cash registers are today used continuously over a period of several hours by one operator. An example of such a use is in a cafeteria or restaurant where there is a continuous passage of customers or waiters by one or more cashiers or food checkers over a period of several hours. In such installations as this it is highly desirable, if not necessary, that the key action of the cash register be very easy both as to lightness of touch and uniformity of depression pressure throughout the full stroke of the keys.

It is the general purpose of this invention, therefore, to provide an improved cash register particularly with respect to the ease of operation thereof.

It is the further object of this invention to provide a novel indicating mechanism for a cash register that is readable in correct reading direction from either front or rear of the machine.

It is a still further object of this invention to provide a novel mechanism for raising and lowering the indicator tab.

It is a still further object of this invention to provide a novel indexing mechanism for the tab magazines.

It is a still further object of this invention to provide a novel mechanism for moving the tab magazines to the position indexed.

Further objects will appear to those skilled in the art as a consequence of the many novel features of construction, arrangement and combination of elements from the following description given in connection with the drawings in which:

Fig. 10 is a perspective view from the rear showing the indicator magazines assembled together with their indexing means and associated mechanisms.

General construction

The cash register mechanism is mounted and carried in a frame comprising right and left metal side or end plates 1 which support the entire mechanism and are maintained in spaced relation by tubular cross members 2 and by the various shafts constituting part of the cash register mechanism. This construction which supplants the older form of cast frame constructions reduces weight but maintains rigidity, facilitates assembly and storage of the machine elements.

Figure 2:
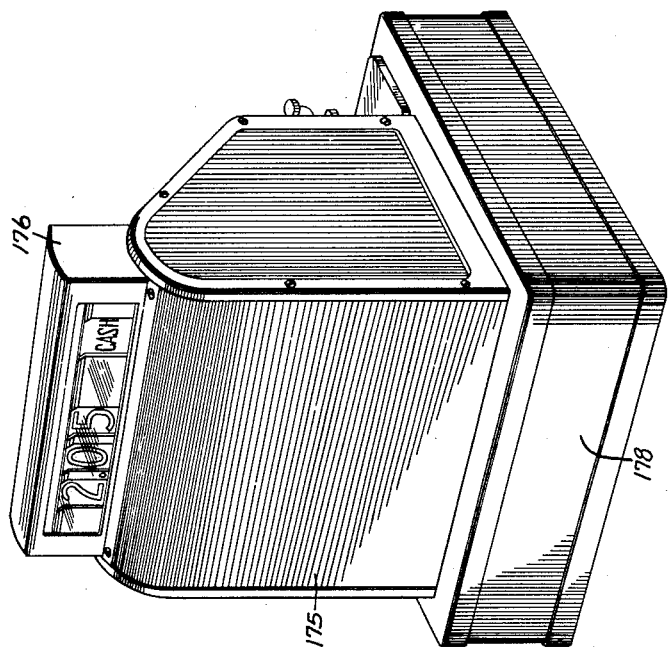
Fig. 2 is a similar view from the rear or customer's position of the machine.
Figure 1:
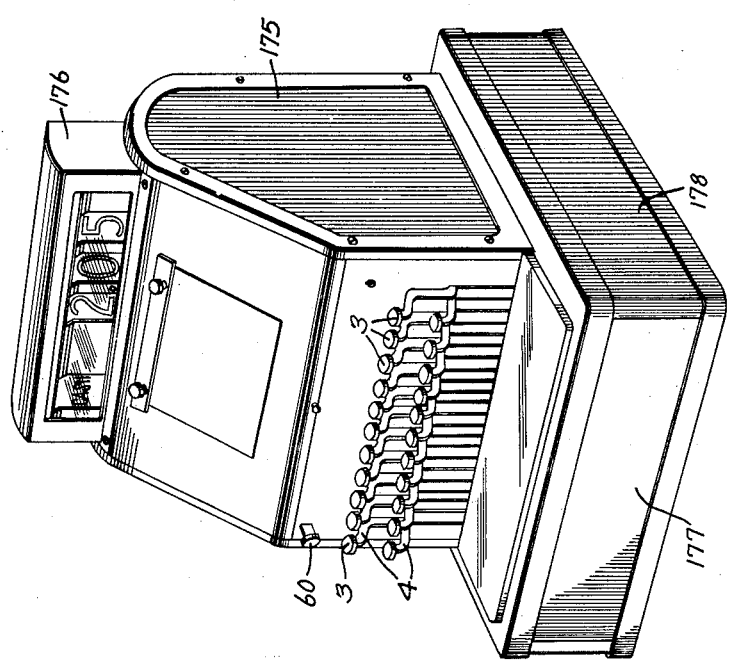
Figure 1 is a perspective view of a cash register as viewed from the operator's position showing the visible indicator tabs raised into view after an amount has been entered into the machine.

Two rows of depressible keys 3 fastened to the outer ends of key levers 4, comprising the necessary number for each denomination, are rotatably supported by cross shaft 5 journaled in the end plates 1. The key levers extend forwardly through a slotted front plate 6, (Fig. 3) and through the outer casing (Fig. 1) and are urged clockwise about shaft 5 by compression springs 7. Each key lever has a rearwardly and upwardly extending arm 9 which engages a hollow shaft 10 of a universal bail and terminates in a cam slot 11. The slots of each key lever are of different inclinations and/or depths and constitute the means for differentially indexing the registers as well as the indicator tabs which will later be explained.

Shaft 10 is supported at each end by one arm of full stroke levers 12 which are secured to shaft 5 at each side of the machine. Shaft 10 extends through the side plates 1, passing through arcuate slots 13 therein, which limit the forward and backward movements of shaft 10 and full stroke levers 12, the latter being constantly urged clockwise by springs 14. Shaft 10 and full stroke levers 12 constitute a universal bail that performs and/or controls many functions of the machine in predetermined timed sequence.

The upper ends of full stroke levers 12 terminate in full stroke racks 16 engageable by a pawl 17 pivoted to each of the end plates 1 to insure a full stroke being made each time a key lever is depressed prior to return thereof. Pawls 17 are urged to normal and vertical positions by means of springs 18 and cams 19 pivoted and secured to each of the end plates, the cams being provided with heart shaped cam openings 21 which engage the pawls 17 and in conjunction with springs 18 force pawls 17 to vertical or normal position, and prevent overthrow of the pawls.

It follows from the foregoing that depression of any of the keys 4 through the rearwardly upstanding arms 9 urges the universal bail forwardly against the action of springs 14. This movement differentially positions the registers as well as the indicator tabs through the cam slots 11 as will later appear. After a full stroke has been taken as compelled by the full stroke racks and pawls, the depressed keys are restored to normal position by springs 7 and the universal bail is restored to normal position by springs 14. The foregoing mechanism is not described in greater detail, being made the subject matter of my co-pending application Serial No. 689,656, filed September 15, 1933, to which reference is made for further description.

*Key coupler*

A key coupler 30 is provided to couple the key levers to the universal bail so that the keys cannot return unless a full stroke is taken, and to latch all partially depressed keys so that they will be depressed upon full depression of any one key. The coupler is in the form of a yoke extending across the entire width of the machine, and terminating in a pair of arms 31 journaled upon the universal bail shaft 10 adjacent each end thereof. The rearwardly and downwardly extending edge or lip 32 of the yoke is adapted to engage lugs 33 extending upwardly from each of the key levers. The coupler is urged clockwise by a pair of springs 34 disposed at each end of the coupler so as to normally urge lip 32 into the path of movement of lugs 33. The key coupler, however, is held in inoperative position by fingers 36 extending from arms 31 which, in normal position, engage studs 37 fixed to and extending inwardly from each of the end plates 1.

Upon forward movement of shaft 10 caused by initial depression of any key the forwardly extending fingers 36 move away from studs 37. The key coupler is thus unlatched or permitted to rotate clockwise under action of springs 34 to move into the path of or behind lugs 33 to connect the keys to the universal bail whereby the full stroke rack and pawl controls both the bail and the keys. The foregoing construction permits the operator of the cash register to partially depress or preset any one or more keys after which the preset keys may be carried the full stroke by full depression of any one key.

*Overthrow preventing mechanism*

To prevent overthrow of the key coupler by abuse of the machine or too rapid depression of any one of the key levers, a lever 40 is pivoted to the left hand arm 31 of the coupler and is yieldingly urged toward stud 37 by a spring 42 and thus offers a yielding resistance by engaging stud 37 to any overthrow of the key coupler.

*Key lock*

It is necessary to provide some means for preventing depression of undepressed keys during completion of the downward stroke of one key. During the early part of movement of the key in being depressed, key coupler 30 moves behind lugs 33 of all depressed keys. As the key depression continues it carries all depressed keys downwardly with the one being depressed. At this time all undepressed keys should be blocked.

For this purpose a cross bail 50 is provided, the bail being pivoted at 51 to each side frame of the machine. The bail is provided with an upstanding lug 52 for each key lever, each lug being engageable with a pin 53 extending laterally from each key lever. The bail 50 is normally held in disengaged position by a spring 54 which tends to rotate the bail counterclockwise about its pivot 51.

Near the extreme end of the return stroke of a depressed key the stud 57 on cranks 56, which during the early part of key depression engaged fingers 58 and rocked bail 50 into key locking position, leave fingers 58 and permit bail 50 to resume its normal position under influence of springs 54.

*Preset mechanism*

When entering an amount in the machine of two or more figures, it is not always convenient for the operator to use both hands to depress the necessary keys and frequently the two keys to be depressed are not within the reach of the fingers of one hand. Provision has been made therefore to enable the operator to preset one or a plurality of keys whereby the keys that denote the amount to be entered may be partially depressed and then any one key fully depressed to carry all of the partially depressed keys down the full stroke to index and enter the entire amount.

For this purpose a preset key 60 is employed and is pivoted to a crank 61. Upon being pushed inwardly preset key 60 rocks crank 61 clockwise about its pivot 62 forcing a rearwardly extending arm 63 to engage a stud 64 carried by the forward end of arm 15 of the left-hand full stroke lever 12. Inward movement of preset key 60 rocks arm 15 to a point where the full stroke pawl 17 engages the first tooth in rack 16 one notch prior to that shown in Fig. 6 and locks the machine in preset condition. In this position coupler 30 is moved into such position that its lip 32 is in the path of movement of lugs 33 of the key levers. Shaft 10 having been moved forwardly by depression of arms 15 assumes a position ahead of the upper arms 9 of the key levers which have not been moved and therefore constitute a yielding limiting stop for the keys as they are depressed to preset condition or position.

Correction of errors

It is frequently desirable to correct an erroneously depressed key. This can be accomplished by depressing fully the special preset key 60.

Figure 6:
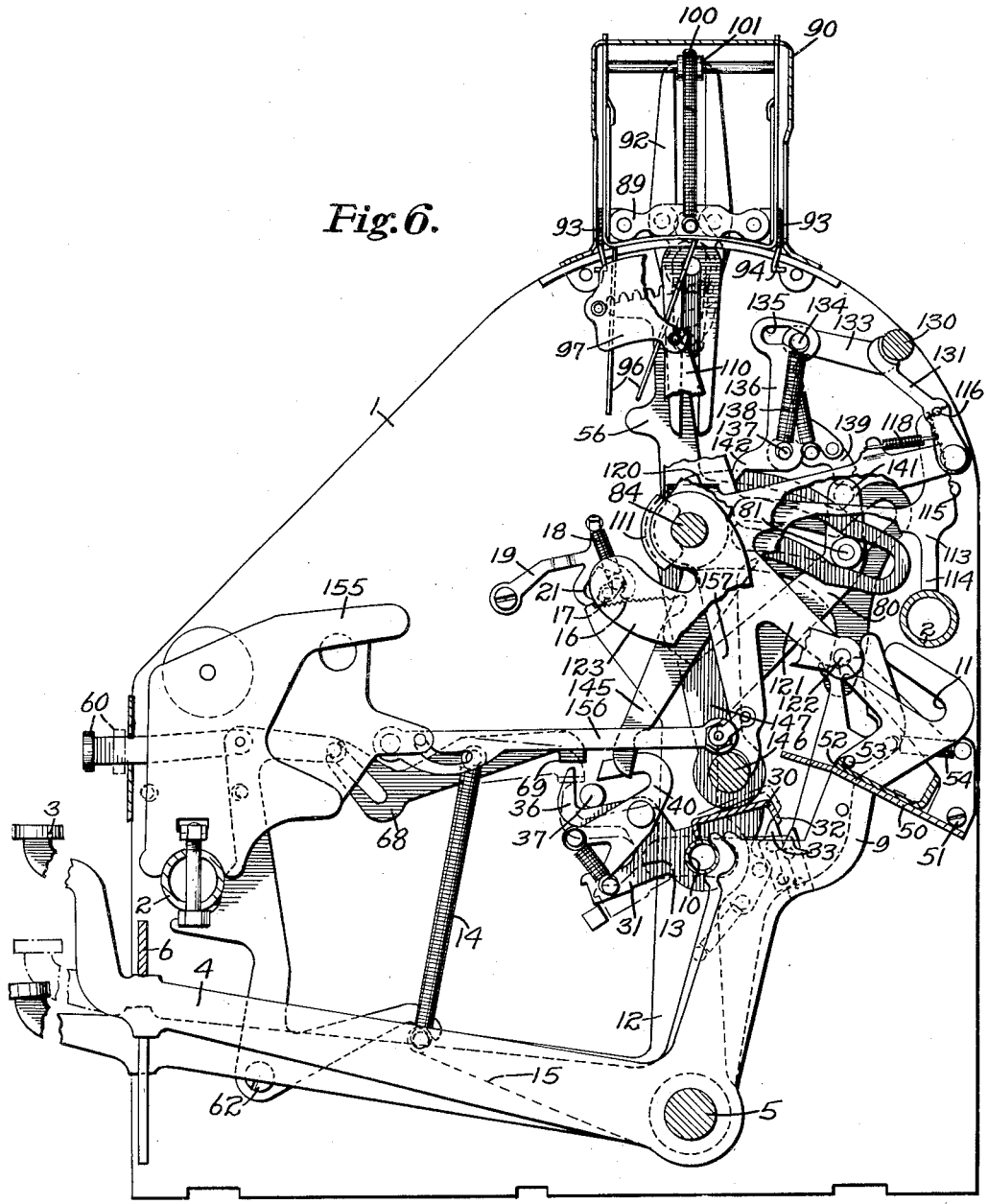
Fig. 6 is a right side sectional elevation showing the tab raising and lowering means and indexing mechanism, the parts being shown in position with a key partially depressed just beyond preset position and the indicator tabs returned to the magazines.

Crank arm 61 has an upper rearwardly projecting finger carrying a stud 66 which engages a cam groove formed in the forward end of lever 68 pivoted intermediate its ends and terminating in an offset lug 69 positioned to engage finger 36 upon full depression of preset key 60 shown in dotted lines in Fig. 6. Therefore, full depression of preset key 60 causes lever 68 to engage finger 36 and rock the key coupler sufficiently to cause its rear edge or lip 32 to clear all lugs 33 on the key levers thus releasing the key levers from latched position.

Character keys

The present machine is provided with two character keys, that is, a "No-sale" key and a "Paid-out" key, the cash indication being made by a cash indicator tab permanently fixed in the indicator housing as will be later explained.

The "No-sale" key functions to cause the "No-sale" tab to be raised. This key also operates a pendent interlock (not shown) to prevent depression of any other key simultaneously with depression of the "No-sale" key.

The "Paid-out" key likewise raises a "Paid-out" tab from a special character magazine. In using the "Paid-out" key, however, contrary to the "No-sale" key, mechanism is provided for forcing the depression of a digit key, thus the amount taken out of the cash drawer of the machine must be registered. The foregoing mechanism relating to the key coupler, overthrow preventing mechanism, key lock, preset key and character keys is not described in greater detail being made the subject matter of my copending application, Serial No. 689,657, filed September 15, 1933 to which reference is made for further details.

Indicator mechanism

The indicator mechanism is designed to be read in correct reading direction from either side, that is, from front or rear of the cash register, and is constructed so as to place very little load upon the key levers and to distribute what load there is over substantially the full stroke of the key lever, both down and return stroke thereof.

The indicating tab raising mechanism is also so balanced and constructed as to substantially eliminate the effects of inertia in raising a tab from lower to visual position. Furthermore, the tab magazines are also balanced as to require very little effort in shifting from one extreme position to the other although the shifting is positive in action and does not rely wholly upon gravity.

In some uses of a cash register it is desirable to omit the visual indicator or tab mechanism. The present construction provides for such a change with a minimum reconstruction of the machine. For this reason the entire indicator mechanism is made detachable, that is, the parts may be removed from the cash register without affecting other portions of the machine by merely detaching several of the parts as will later be explained.

Each of the full stroke levers 12 has a rearwardly and upwardly extending arm 80 carrying studs 81 which project laterally from both sides of the arms. Upon one side of the arm, studs 81 engage in cam slots 82 formed in each of two cranks 56, pivoted upon a shaft 84 extending across the machine, one crank being at each side of the machine. It will be recalled that cranks 56 operate the key blocking bail. Cam slots 82 are so shaped that cranks 56 are moved upon a very slight depression of a key and are thereafter not moved until returned to normal position near the end of the return movement of the key lever.

The upper arms of cranks 56 are provided with toothed sectors 86 meshing with pinions 87 disposed at each side of the machine and pivoted on studs secured to the side frames 1. To each gear 87 is secured an arm 88 which is connected to an indicator bail 89 by a link 91 whereby the reverse rotation of gear 87 will reciprocate bail 89 within an indicator frame 90. The latter comprises a pair of telescoped U-shaped members extending across the entire machine. The arms of one member extend upwardly and the arms of the other downwardly, the outer arms being provided with openings through which the indicator tabs may be viewed. Bail 89 is guided for vertical reciprocatory movements by two pairs of forked slides 92, one slide being carried by each end of the bail and straddling projections of studs supporting gears 87 and one slide being secured to each of the end plates at each side of the machine and which straddle rollers 95 carried by the bail.

Bail 89 carries a pair of arms 93 extending across the entire width of the machine, each arm preferably being colored so as to be readily visible for reasons later to appear and being provided with laterally extending hooks 94 for each denomination of tabs 96 for selectively engaging the tabs, the latter being provided with T-shaped slots at their upper ends adapted to be engaged by hooks 94.

The tabs are contained in tab magazines or supports 97, there being a pair of magazines for each denomination, that is, a magazine on each side of the machine for each denomination; one pair for the cents, one pair for the dimes and one pair for the dollars, so arranged that the indicator tabs when raised therefrom may be read in reading direction from left to right from both the front and rear of the machine.

Figures 3, 4:
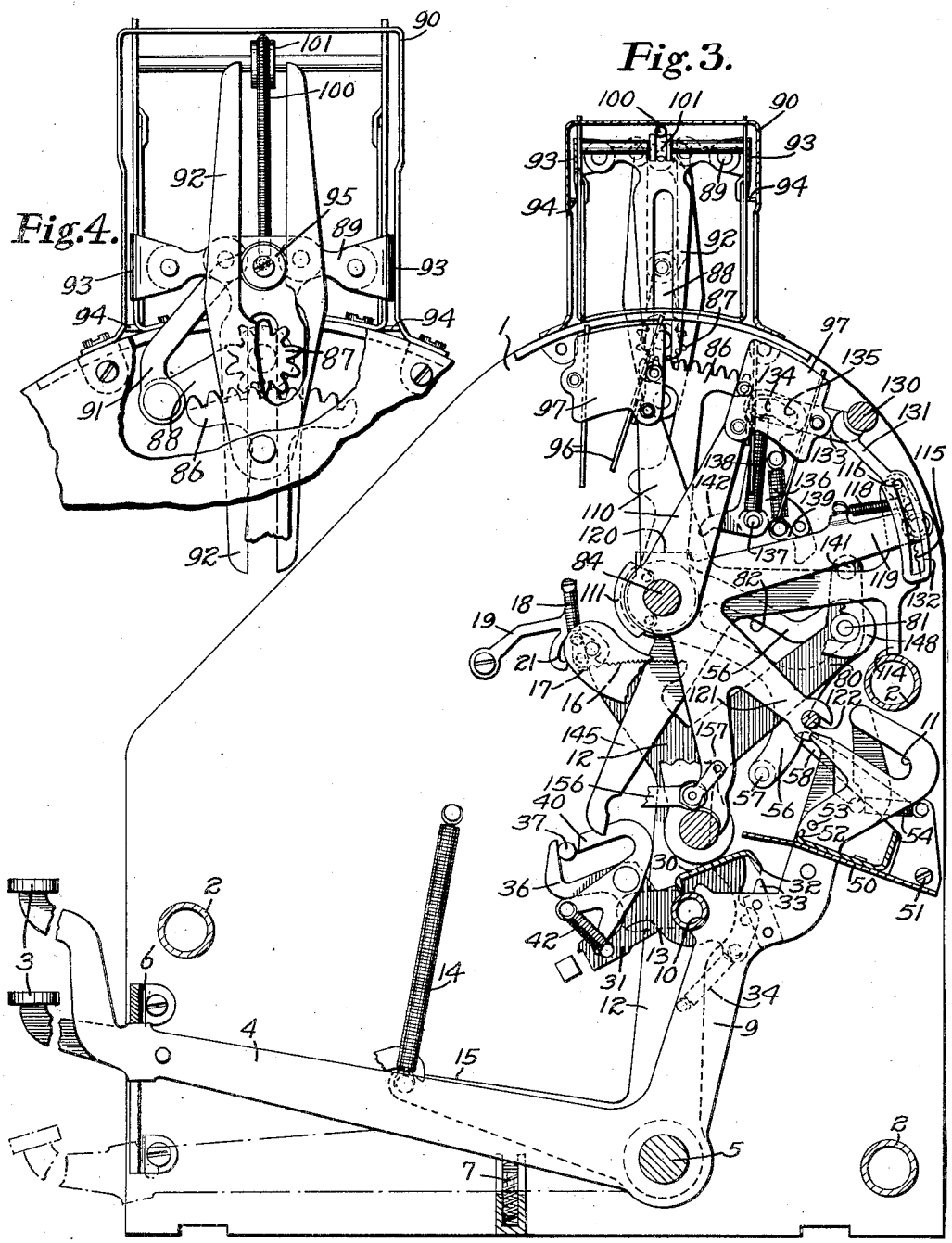
Fig. 3 is a right side sectional elevation showing the raising and lowering means for the indicator tabs and certain elements of the indexing mechanism, all parts being in normal position.
Fig. 4 is a left side enlarged detail elevation from the outside of the machine showing the raising and lowering means for the indicator tabs in preset position.

During the initial portion of a key depression to present position, bail 89 is immediately lowered as shown in Fig. 4. This movement of the bail is due to the immediate movement of cranks 56. In this position arms 93 will be visible and being easily detectible will give notice to the clerk, manager, and/or customer that a transaction has been started but not completed. Upon slight farther depression of a key as shown in Fig. 6 the machine is moved slightly beyond preset position and the tabs are fully returned to their magazines.

During the remaining portion of the downward stroke of the key levers, bail 89 remains in lowered position due to the dwell in the cam slots 82 and cranks 56. Immediately after reaching preset position, bail 50 is raised which locks all undepressed keys.

Also during the remaining portion of the downward stroke of the key levers the tab magazines are disconnected and are returned to normal position while the indexing mechanism is set by the keys as will appear more fully hereinafter.

During the initial portion of the upward or return movement of the key levers the indicator bail still remains lowered and the tab magazines are moved to indexed position. At the final portion of the upward movement of the keys, the tabs are picked up by the hooks 94 and raised to visible position to indicate the amount entered into the machine by depression of the keys. When raised the tabs still remain with their lower ends engaged in the tab magazines thus retaining the tab magazines in indexed position ready to receive the tabs upon lowering of the bail. The indexed tabs remain in upper position until a new entry has been started in the machine.

Figure 7:
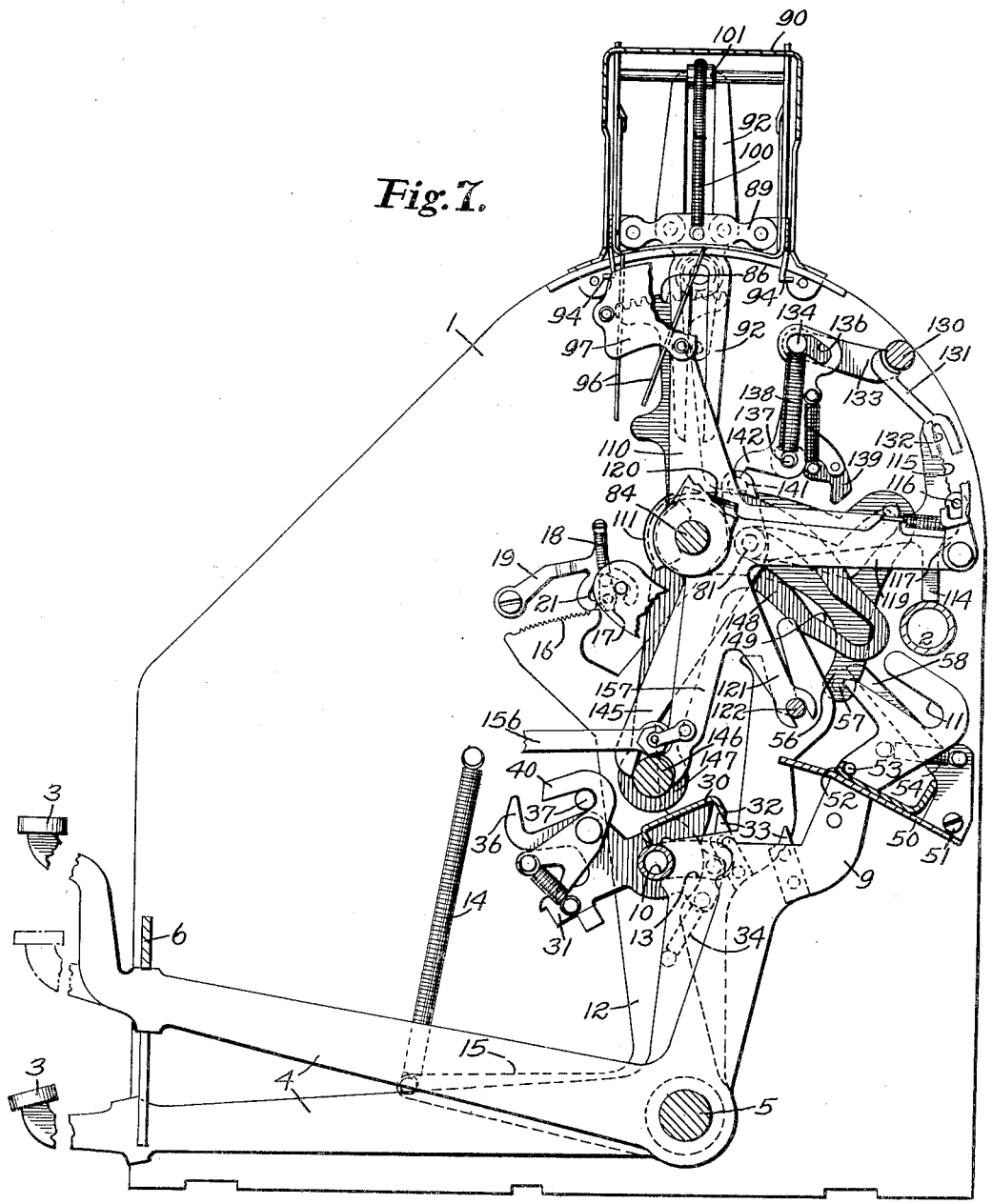
Fig. 7 is a right side sectional elevation similar to Fig. 6 but showing the machine in position with a key fully depressed.

To substantially balance bail 89 so as to minimize any load placed thereby on the key levers and to overcome the effects of inertia in raising the tabs from lowered position, a long tension spring 100 (Figs. 6, 7 and 8) is stretched across the top of the indicator housing, passed over two pulleys 101 at each end thereof, and secured at its ends to the indicator bail 89. The spring balances the weight of the indicator bail and tabs and exerts a slight upward pull on the bail, particularly when it is in lowermost position where it is necessary to overcome the inertia of the bail against starting it in upward direction from stationary lower position and in effect substantially "floats" the bail. The spring does not affect the tab magazines which are freely journaled as will be described in more detail hereafter.

The mechanism for raising and lowering the bail including the spring, gear and rack mechanism offer some slight retardation to the upward or return movement of the keys and therefore acts as a sort of damper to restrict the keys against too rapid return movement.

*Indicator tab magazines*

The indicator tab magazines are also constructed and mounted so as to place very little load upon the keys and to distribute what load there is upon those portions of the key depressions when little else is being accomplished thereby. As previously stated there is a pair of tab magazines for each denomination, that is, a pair for the cents tabs, a pair for the dimes tabs, and a pair for the dollars tabs, each magazine of each pair having a full set of tabs from 1 to 9, the zeros being permanently placed upon the indicator frame members 90 in full vision at any time that no other tab is moved in front thereof. The tab magazines are preferably constructed of some relatively light weight material such as "bakelite" or other suitable material having a low moment of inertia and being unaffected by climatic changes. The magazines are slotted to receive the tabs and support them in spaced relation, the tabs being partially in the slots when the tabs are fully raised to retain the tab magazines in indexed position as previously stated.

A magazine 97 for each denomination is secured to each of the upper ends of arms 110 (Figs. 9 and 10) of yokes 111, the arms being connected by a cross yoke member and journaled on the cross shaft 84 extending the full width of the machine and journaled in the side plates.

Figure 9:
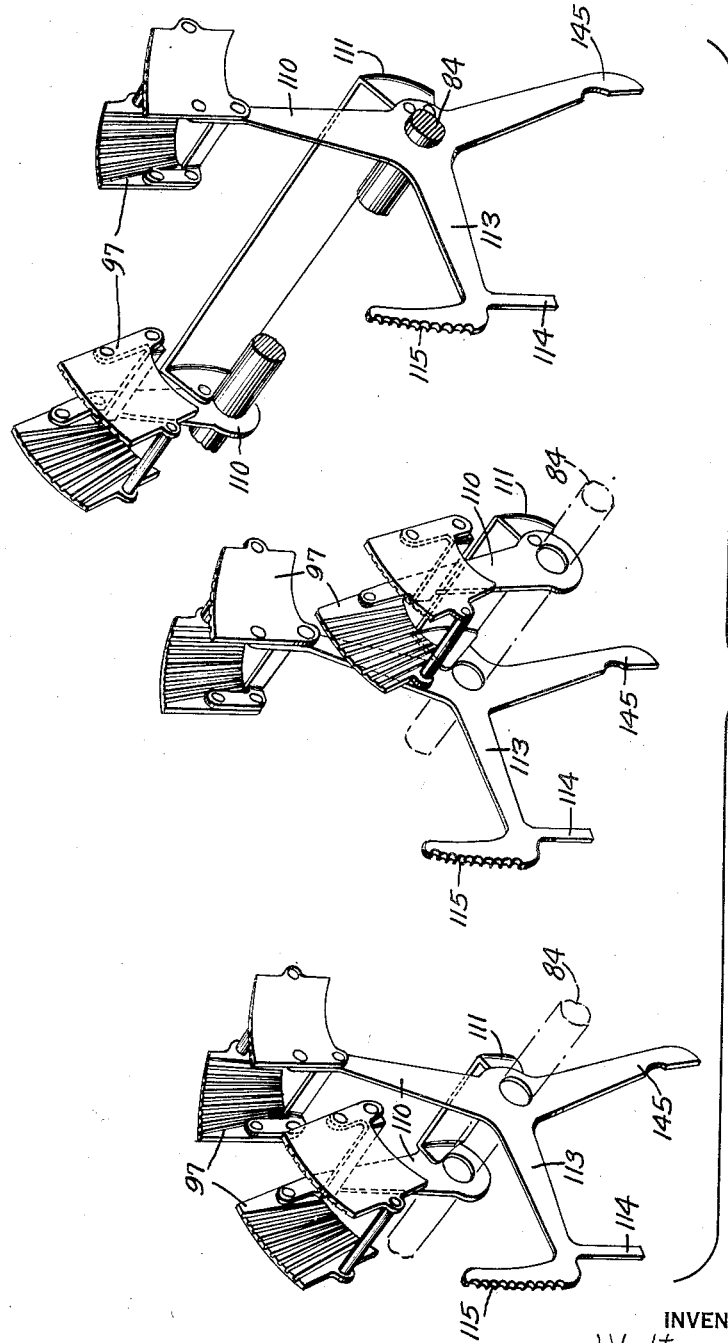
Fig. 9 is a distended perspective from the rear of three groups of indicator magazines for the units, tens and dollar tabs.

The magazines are nested to save space as shown in extended view in Fig. 9 and in assembled view in Fig. 10. This arrangement also makes it possible to place the indicator tabs closely together whereby they may be assembled with greater compactness.

Bearing in mind that the indicator tabs are to be read from left to right from both the front and the rear of the machine, it is necessary to space the dollar denomination magazines widely apart so as to assume the two end positions; the dimes denomination magazines may be substantially one in front of the other, whereas the cents denomination magazines are spaced apart not as widely as the dollar magazines, but sufficiently to assume positions upon each side of the dimes magazines to the right thereof. This spacing of the magazines is accomplished by using different width or length cross members as shown in Fig. 9 in extended view and in Fig. 10 in assembled view.

The magazines being in pairs, one forward and the other to the rear of shaft 84, substantially balance each other. Positive means are provided, however, for insuring return of the magazines to initial or normal position at each operation of the machine. However, one side is slightly heavier so that the magazines will automatically return to zero under the action of gravity at each operation of the machine without placing any load upon the keys. The tendency to rotate to normal position is very slight and the magazines being made of a relatively light material, little energy is necessary to move them from normal position to indexed position which indexing will now be described.

*Indicator magazine indexing*

The indexing of each pair of the three digit magazines is substantially the same and therefore will be described in connection with only one pair. One arm 110 of each yoke 111 has an integral rearwardly extending arm 113 provided with a depending finger 114 which engages the rear tubular spacing shaft 2 to limit the clockwise movement of the yoke and magazines carried thereby. The free end of arm 113 is provided with ten rack teeth 115 adapted to be differentially engaged by a pin 116 carried upon the end of a pivoted link 117 normally urged counter-clockwise by a spring 118 into engagement with teeth 115. Pins 116 are permitted to engage teeth 115 at the proper periods for proper indexing as will be explained hereinafter.

Link 117 is pivoted to the outer end of an arm 119 of an indexing yoke 120 having an integral forked arm 121 which for the cents keys engages directly a bail 122 carried by arms 123 freely journaled on shaft 84 and which extends across all of the cents keys and engages in the differential cam grooves 11 therein. It will be understood that there is a yoke 120 and a corresponding bail 122 for each denomination of keys, that is, for the cents keys, the dimes keys, and the dollars keys. The forked arm 121 for the dimes keys does not directly engage its corresponding bail 122 but engages instead a stud 124 carried by one arm 123 supporting bail 122. The forked arm 121 for the dollar keys likewise engages a stud 124. Each pair of magazines 97 is therefor indexed according to the key depressed in the corresponding denomination.

The tab magazines are returned to zero or normal position at each operation of the machine, and means are provided for controlling the indexing pins 116 to disengage them from rack teeth 115 to permit the magazine to resume normal position at each operation of the machine and to reengage pins 116 with the racks 115 at variable positions therewith in time so that the magazines will be moved to indexed position prior to raising of the indicator bail. For this purpose a shaft 130 is journaled in the side plates 1 adjacent the upper ends thereof to which shaft is rigidly secured an arm 131 for each pin 116. Each arm has an elongated arcuate closed cam slot 132 of sufficient length to receive pin 116 throughout its full stroke. Adjacent its left hand end shaft 130 is provided with an arm 133 rigidly secured thereto and carrying a pin 134 at its forward end, which pin projects through a cam slot 135 in the upper end of a lever 136 pivoted at 137 to the left end plate 1. A tension spring 138 connected at one end to pin 134 and at its other end to pivot pin 137 tends to insure positive and immediate actuation of shaft 130 and pins 116 into and out of engagement with teeth 115 when shaft 130 is rotated by cam 135.

Lever 136 carries a pass-by pawl 139 pivoted to the rear lower end thereof, which pawl is free to rotate counterclockwise relatively to the lever, but cannot rotate clockwise relatively to the lever. Pawl 139 is in position to be engaged by a stud 141 projecting laterally from the upper end of arm 80 of the full stroke lever 12. Stud 141 engages pawl 139 immediately after the first portion of the forward stroke of the full stroke lever and after the indicator bail has been lowered to replace the tabs held thereby in their respective magazines. Engagement of stud 141 with pass-by pawl 139 rocks lever 136 and permits counter-clockwise rotation of shaft 130 under action of the cam slot 135 aided by spring 138, thus disengaging pins 116 from teeth 115. During the time the shaft 130 is in this position, which is during the major portion of the down stroke of the keys, the magazines are free and are permitted to rotate by gravity to normal position. During this downward movement of keys 4 the differential cam slots 11 of those keys depressed differentially position arm 119 carrying pin 116.

At the last portion of the forward movement of the full stroke lever or the downward movement of one of the key levers, stud 141 engages a hooked finger 142 on lever 136 and rotates the latter clockwise which, through its cam slot 135, causes clockwise rotation of shaft 130 and reengagement of pin 116 with the teeth of rack 115, i. e., with the tooth determined by the position of arm 119 which in the meantime has been indexed so that upon reengagement, pin 116 will engage the proper tooth 115 to index a pair of tab magazines according to the keys depressed. During the return of the depressed keys toward normal position, the cam slots 11 rock the bails 122, the arms 121 and arms 119 with their pins 116 counterclockwise about the shaft 84, and the pins 116, being engaged in the notches 115 selected by the depressed keys, carry the arms 113 and thereby also the arms 110 and the tab magazines 97 counterclockwise about the shaft 84 distances corresponding to the notches 115 in which the pins 116 are engaged, whereby the indicator tabs corresponding to the keys which were depressed are brought into position to be lifted by the hooks 94 of the indicator arms 93.

The movement of the tab magazines to indexed position takes place during the first portion of the upward or return movement of the key levers, after which the tab is raised to visual position at the final upward movement of the key levers. Therefore what little load is placed upon the key levers by the indexing mechanism and movement of the magazine to indexed position is distributed substantially over the full stroke of the key lever except the very initial and final portions of the movement which portions are used to first place the machine in preset condition on the down stroke, then complete the lowering of the previously set tab at the end of the down stroke and raise the new tab near the end of the return stroke of the key lever.

To insure positive return of the magazines to normal position at each operation of the cash register, the magazine yokes 111 are provided with downwardly projecting arms 145 positioned to be engaged by a return bail 146 extending across the machine. Bail 146 is supported at each end by one arm 147 of cranks disposed at each side of the machine and journaled on shaft 84. The other arms 148 of the cranks have cam grooves 149 therein into which extend the inwardly projecting ends of studs 81 carried by the full stroke levers 12. Upon oscillation of the full stroke levers which occurs once for each machine operation, crank arms 148 and 147 are rotated to swing bail 146 into contact with those arms 145 which may be in the path of movement of the return bail 146 by reason of the magazines not having dropped to normal position by gravity and thereby insure a positive return of the magazines.

During the return stroke of the keys and full stroke levers, the return bail 146 is returned to its normal position and the tab magazines are moved to the indexed positions as already described.

Omission of indicator

In the event that it is desired to omit the indicator mechanism in its entirety, this may be done without affecting the machine in general and without any attention to the remaining mechanism. This is possible because of the absolute independence of the indicator raising and lowering mechanism.

The tab bail 89, arms 93 and indicator frame 90, together with slides 92, links 91, arms 88 and gears 87 can be removed or omitted in their entirety by merely removing the securing means and studs. The lower cranks 56 must remain inasmuch as it is these cranks which actuate the key locking bail 59. The foregoing mechanism being detachable makes it possible to provide a machine that is readily adaptable to either a visual indicator type of machine or a machine without a visual indicator. In the latter case, the totalizing registers alone would be actuated by the keys. A non-indicating machine can, therefore, be provided without complete destruction and reorganization of the entire machine. It is only necessary to omit those parts heretofore referred to and provide a suitable cover over the casing where otherwise the indicating mechanism projects therethrough.

Register indexing

Figure 5:
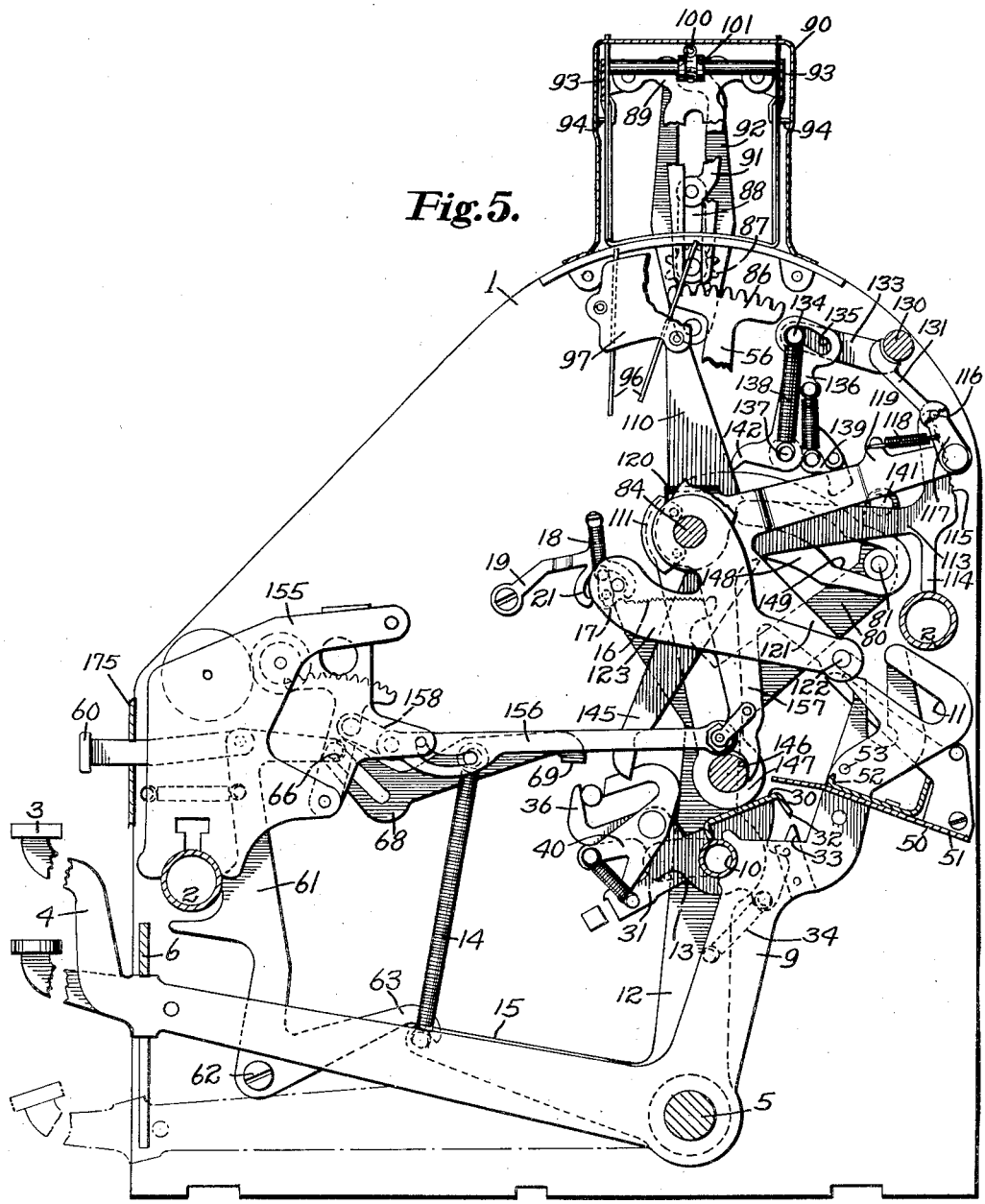
Fig. 5 is a right side sectional elevation showing the raising and lowering means for the indicator tabs and other portions of the tab indexing mechanism, all parts being in normal position.

A totalizing accumulator or register 155, Figs. 5 and 6, for accumulating and totalling the amounts entered into the machine is secured to the side frames of the machine. The register has a section for each denomination of keys coupled together by suitable transfer mechanisms so that they carry over from one section into the next succeeding higher section. Each of the sections of register wheels are actuated from their corresponding indexing bail 122 actuated in turn from the corresponding key section or denomination through a link 156 pivoted at one end to an arm 157 depending from the yokes 120. The opposite ends of links 156 are connected to the register wheels through a toggle linkage 158 which may be disabled for non-add purposes such as when paid out operations are performed in the machine. The specific register operating means and controls are not described in greater detail being made the subject matter of my copending application Serial No. 689,659, filed September 15, 1933 to which reference is made for further details.

*Character magazine*

As previously stated, the illustrated machine is provided with character keys such as a "No-sale" key and a "Paid-out" key, the character indicator for a cash transaction being secured permanently in the indicator housing.

Figure 8:
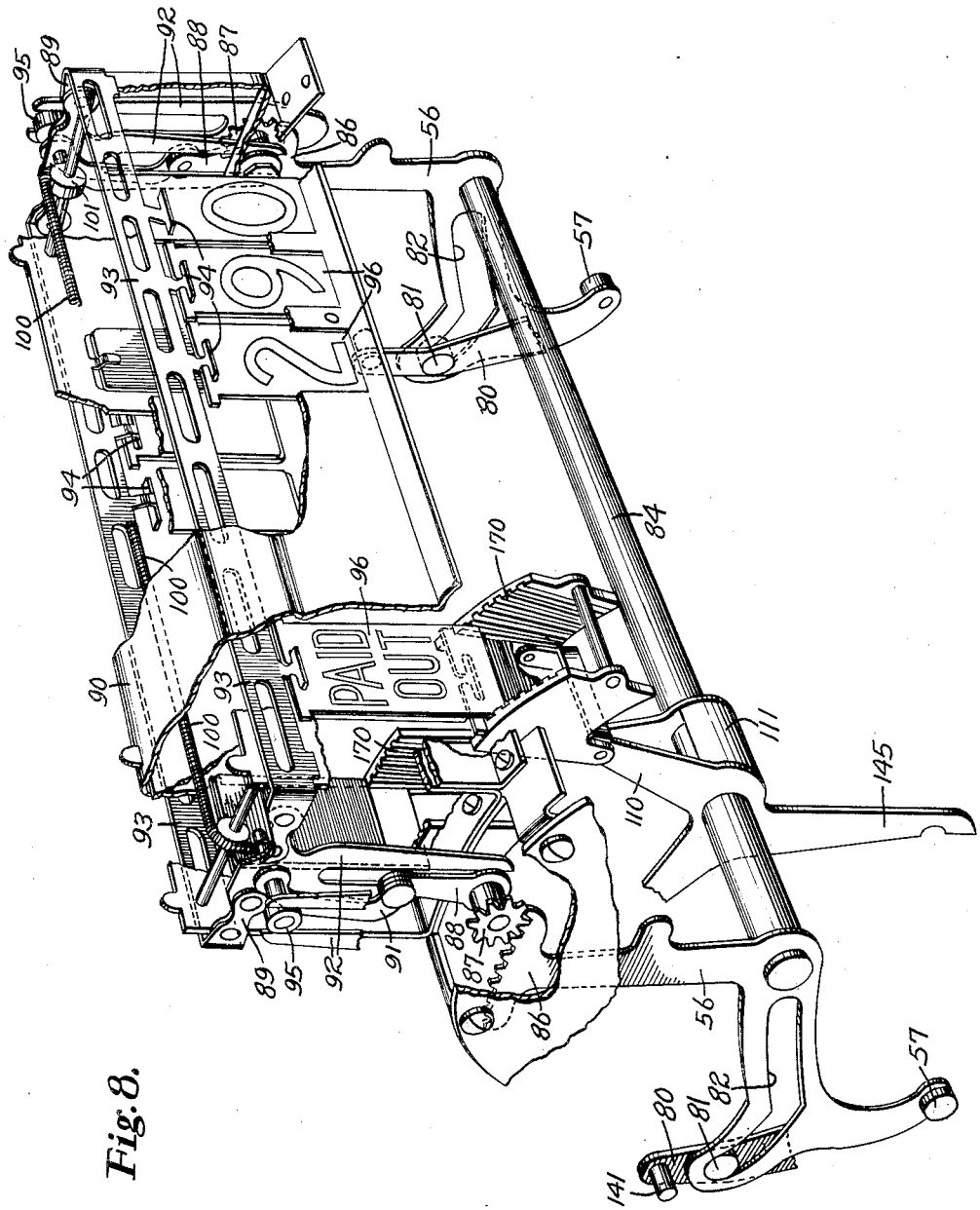
Fig. 8 is a front perspective view of the indicator tab raising and lowering mechanism and including one pair of tab magazines.

An independent pair of tab magazines 170 is provided for the character keys as shown in Fig. 8. These magazines are supported by a yoke similar to yoke 111, but are not telescoped with the other magazines being disposed at one end of shaft 84. These magazines are operated in a manner similar to the digit tab magazines and will therefore not be described.

The entire cash register is enclosed in a sectional casing 175 and a removable indicator housing 176 mounted above a cash drawer 177 enclosed in a suitable housing 178.

*Operation*

Summarizing briefly the operation of the indicating mechanism: At the initial depression of an amount or digit key from normal to preset condition the universal bail including full stroke levers 12 and shaft 10 and the key coupler 30 are moved forward slightly until the full stroke pawl engages the first notch in the full stroke rack. This slight movement of the full stroke levers 12 also rocks cranks 56 which immediately lower the indicator tab bail 89 so that the cross bars thereof are visible through the windows in the indicator housing (Fig. 4). This movement, however, does not quite return the tabs into the magazine. Upon the very next portion of the downward movement of the keys within the limits of the next one or two notches of the full stroke rack the tabs are wholly returned to the magazine, shaft 130 is rocked by the levers to disconnect pins 116 from the differential racks 115, thus permitting the tab magazines to drop by gravity or be positively moved to normal position. This position of the machine is clearly shown in Fig. 7.

During practically all of the remainder of the down stroke of the keys the tab magazines are free and the indexing arms 119 are indexed in accordance with the keys depressed. That is, the bails 122 are set by the cam slots 11 in the upper portion of the key levers and the bails in turn move arms 119 into differential positions so that pins 116 are to the rear of the proper teeth in racks 115. At the very end of the down stroke, shaft 130 is again rocked and pins 116 are reengaged in the toothed racks 115.

Upon the up or return stroke of the keys beginning with the initial portion thereof the magazines are moved to the indexed positions. During the final portion of the upward movement of the keys and after the magazines have been moved to indexed position, the indicator bail 89 is raised, i. e., lugs 94 carry with them the indexed tabs to visual position. These tabs then remain in visual or raised position with their lower ends engaging in the magazines to retain the magazines in indexed position until the next depression of a key or keys.

From the foregoing discussion it will be apparent that the work performed in operating the indexing mechanisms and indicating mechanisms is distributed throughout the full operation of the keys, that is, up and down stroke of the key levers, therefore tending towards uniform key action as well as light key action. During the first portion of the key depression the general operating means including the universal bail is moved through a preliminary conditioning movement and the indicator bail is moved to lower previously raised tabs. During the latter portion of the key depression the indexing mechanism is set, during the first portion of the return stroke the magazines and registers are moved to the newly indexed position, and during the last portion of the up stroke the indicator tabs and indicator bail are raised. This even distribution of the work of setting and moving the indicating mechanism reduces the energy necessary to depress the keys over that which it would be if all of the work was accomplished on the down stroke of the keys. This distribution also reduces the work which would be necessary if the work were to be accomplished on the up stroke and the energy therefore had to be stored in springs upon the down stroke of the keys. The distribution therefore contributes greatly toward an easy key action in a cash register.

It will be understood that while this invention has been shown as applied to a key operated cash register, certain features thereof are applicable to cash registers of other types such as key set machines.

It will be apparent to those skilled in the art that many modifications may be indulged in the details of construction of the various elements of the mechanism heretofore described without departing from the spirit and scope of this invention as defined in the appended claims.

I claim:

1. In a key operated cash register, depressible keys for operating the cash register, a bail differentially moved by each key, a pair of pivoted indicator tab supports for each denomination of keys, connections between said bail and said supports for indexing the latter, and means for engaging said connections at predetermined times with respect to the movement of said key and following differential movement of said bail for causing said supports to be indexed upon return movement of said bail and for disengaging said connections at predetermined times in the movement of said key.

2. In a key operated cash register, depressible keys for operating the cash register, a bail actuated by each key, a pair of pivoted indicator tab supports for each denomination of keys, connections between said bail and said supports for indexing the latter, and means for disengaging said connections during down stroke of a digit key and reengaging said connections during the upstroke of said key.

3. In a cash register, depressible keys, a pivoted magazine yoke for each denomination of keys freely journaled for rocking movements and having a pair of arms extending therefrom, a pair of tab magazines carried by said arms, an indexing arm projecting from said yoke, and means controlled by said keys for engaging said latter arm to index said magazines, said yoke having another projecting arm, and means for engaging said arm to positively return said yoke to normal position after each key depression.

4. In a cash register, depressible keys, a pivoted magazine yoke for each denomination of keys, said yoke being freely journaled for rocking movement and having a pair of arms, a pair of tab magazines secured to said arms for simultaneous movement with said yoke, said arms and magazines being disposed upon opposite sides of the yoke pivot, and means controlled by said keys for differentially positioning said yoke.

5. In a key operated cash register, depressible keys for operating the cash register, indicator tabs, a tab support, means for raising and lowering the tabs from and into said support, a bail differentially movable by said keys for indexing said support in accordance with the key depressed, variable connections between said bail and said support, and means for disengaging said connections at a predetermined period in the operation of the cash register prior to indexing of said support and for engaging said connections prior to and during indexing of said support.

6. In a key operated cash register, depressible keys for operating the cash register, indicator tabs, a tab support, means for raising and lowering the tabs from and into said support, a bail differentially movable by said keys for indexing said support in accordance with the key depressed, connections between said bail and said support, and means for disengaging said connections at the same period at each operation of the cash register prior to indexing of said support and for engaging said connections at the same period at each operation of the cash register prior to and during indexing of said support.

7. In a cash register, depressible keys, indicator tabs, a tab support mounted for differential movement, means for raising and lowering the tabs from and into said support, a bail differentially movable by said keys for indexing said support in accordance with the key depressed, variable pin and toothed connections between said bail and said support, and means for engaging and disengaging said pin and toothed connection, said support being free upon disengaging said connections for return movement to normal position at a predetermined period during operation of said machine.

8. In a cash register, depressible keys, indicator tabs, a tab support mounted for differential movement, means for raising and lowering the tabs from and into said support, a bail differentially movable by said keys for indexing said support in accordance with the key depressed, variable pin and toothed connections between said bail and said support, and means for disengaging said connections during the down stroke of a key to permit free return movement to normal position of said support and reengaging said connections during the return stroke of the key.

9. In a key operated cash register, depressible keys for operating the cash register, indicator tabs, a tab support mounted for differential movement, means for raising and lowering the tabs from and into said support, a bail differentially movable by said keys for indexing said support in accordance with the key depressed, connections between said bail and said support, means for engaging and disengaging said connections, and a restoring bail adapted to engage said support to positively return said support to normal position at each cash register operation.

10. In a key operated cash register, depressible keys for operating the cash register, indicating tabs, freely pivoted tab supports, means for returning the tab supports to normal position, a bail for lowering the tabs into said supports at the initial portion of a key depression, means for differentially indexing said supports, means for disengaging said latter means from said support and setting said indexing means during further depression of said key, and means for reengaging said indexing means with said supports upon the initial portion of the return movement of said keys, said bail raising said tabs at the final portion of the upstroke of said key.

11. A cash register having a plurality of depressible keys, a general operating means, an indicating mechanism including a plurality of sets of indicator tabs, movable tab supports for said tabs, means for indexing said supports to bring into line the tabs corresponding to keys depressed, and means for raising and lowering the indexed tabs, said raising and lowering means including a "floating" frame, means for supporting said frame normally free for vertical movement and means for substantially counterbalancing said frame so that it may be easily moved in either a raising or a lowering direction.

12. A key operated cash register having a plurality of manipulative key levers, a general operating means movable by said key levers, said operating means being first movable through a preliminary conditioning movement and then through an operating movement after which it is returned to normal, indicating mechanism including sets of indicator tabs carried by movable supports, said tabs being movable to and from a visible position, means for returning said supports to normal positions during the first portion of said operating movement, means for indexing said tab supports to bring into line the tabs corresponding to the keys depressed, and means operated by said general operating means during said preliminary movement for lowering previously raised tabs and, during the latter part of said return movement, for raising newly indexed tabs.

13. A key operated cash register having a plurality of manipulative key levers, a general operating means movable by said key levers, said operating means being first movable through a preliminary conditioning movement and then through an indexing movement after which it is returned through an operating movement and then through a final return movement to normal, indicating mechanism including sets of indicator tabs carried by movable supports, said tabs being movable to and from a visible position, means for indexing said tab supports during indexing movement to bring into line the tabs corresponding to the keys depressed during operating movement, and means operated by said general operating means during said preliminary movement for lowering previously raised tabs and, during said final return movement, for raising newly indexed tabs.

14. A key operated cash register having depressible keys, an indicating mechanism comprising indicator tabs, tab magazines, an indicator bail for raising and lowering said tabs from said magazines to visible position, spring means for raising said bail, said means being substantially ineffective during the upper portion of the raising movement of said bail whereby said bail is substantially "floated" between the limits of its movement, operating mechanism between said keys and said bail whereby said bail lowers said tabs at the initial movement of said keys and raises said tabs at the final movement of said keys, and means under control of said keys for differentially positioning said tab magazines with respect to said bail between lowering and raising of said bail.

15. A key operated cash register having a plurality of manipulative key levers, a general operating means movable by said key levers, said operating means being first movable through a preliminary conditioning movement and then through an operating movement after which it is returned to normal, indicating mechanism having a plurality of sets of indicator tabs carried by movable supports, said supports being pivoted and balanced so as to be easily movable to and from differential positions, means for indexing said supports to bring into line the tabs corresponding to the key levers that have been manipulated, and means operated by said general operating means during said preliminary movement thereof for lowering previously raised tabs and, during the latter part of said return movement, for raising newly indexed tabs, said raising and lowering means including a "floating" frame which is counterbalanced so as to be easily movable in either a raising or a lowering direction, whereby said cash register with its indicating mechanism may be operated by a relatively light and uniform depression of said key levers.

16. A key operated cash register having depressible keys, indicator tabs, tab magazines, an indicator bail for raising and lowering said tabs from said magazines to visible position, operating mechanisms between said keys and said bail whereby said bail lowers said tabs at the initial movement of said keys and raises said tabs at the final movement of said keys, and operative connections under control of said keys for differentially positioning said tab magazines while said tabs are in lowered position and during depression and return of said keys the positioning of said magazines serving as a resistance to return movement of said keys to prevent too rapid return movement thereof.

17. A key operated cash register having depressible keys, an indicating mechanism comprising indicator tabs, tab magazines and an indicator bail for raising and lowering said tabs from and to said magazines, operating mechanisms between said keys and said bail whereby said bail lowers said tabs at the initial movement of said keys and raises said tabs at the final movement of said keys, indexing means operable after the initial movement of said keys and during further depression of said keys, and means for moving said tab magazines to indexed position during the initial portion of the return stroke of said key.

18. A key operated cash register having depressible keys, indicator tabs, a pair of tab magazines for each denomination freely journaled for rocking movements and being returnable by gravity to normal position, means under control of said keys for indexing the position of said magazines, means positively actuated upon each operation of said machine for positively returning said magazines to normal position at each operation of said machine, and an indicator bail for raising and lowering said tabs out of and into said magazines at each operation of said machine.

19. A key operated cash register having depressible keys, indicator tabs, a pair of tab magazines for each denomination freely journaled for rocking movements, means under control of said keys for indexing the position of said magazines, and means operated by said keys for positively returning said magazines to normal position at each operation of said machine.

20. In a cash register, manipulative keys, a pivoted indicator tab support for each denomination of keys, a member for each group of keys movable differentially upon movement of any key in the group, disconnectible connections between said members and said supports for moving said supports in accordance with the key depressed, and means for disconnecting said connections prior to differential movement of said supports and for making said connections prior to and during differential movement of said supports.

21. In a cash register, manipulative keys, a pivoted indicator tab support for each denomination of keys, a member for each group of keys movable differentially upon movement of any key in the group, disconnectible connections between said members and said supports for moving said supports in accordance with the key depressed, and means for disconnecting said connections at predetermined constant points in the operation of said register and prior to differential movement of said supports and for making said connections at predetermined constant points in the operation of said register prior to and during differential movement of said supports.

22. In a key operated cash register, depressible keys for operating the cash register, a pivoted indicator tab magazine, differentially movable means actuated by each of said keys for differentially moving the magazine in accordance with the keys depressed, variable connections between said key actuated means and said magazine, and means for disengaging said connections at constant points in the depression of said keys prior to and during return movement of said magazine and for thereafter reengaging said connections at constant points in the key movement, following return movement of said magazine and prior to and during a succeeding differential movement of said magazine.

23. A key operated cash register having depressible keys, indicator tabs, indicator magazines, means operable upon the first portion of key depression to lower said tabs from visual position into said magazines, and means for thereafter indexing said magazines during further depression and the first portion of the return of said keys, said first mentioned means being operable thereafter raising said tabs to visual position.

24. A key operated cash register having depressible keys, differentially movable indicator magazines, indicator tabs therein, means controlled by and operable upon the first portion of key depression for lowering said tabs from visual position into said magazines, indexing mechanism movable thereafter and upon further depression of said keys to differential positions to which said magazines are to be moved, and means operable thereafter for moving said magazines to said indexed positions upon the initial portion of the return stroke of said keys, said first mentioned means being operable thereafter to raise said tabs to visual position.

25. In a key operated cash register, movable indicator magazines having indicating means therein, indexing means for moving said magazines, a shaft, depressible keys supported by said shaft, a universal bail carried by said key supporting shaft and comprising a shaft extending across said machine and a supporting arm adjacent each end thereof, said keys having levers arranged to engage said indexing means and said cross shaft between said arms to move said bail and means actuated by said universal bail for raising and lowering said indicating means.

26. A key operated cash register having depressible keys, a universal bail operated by said keys, an indicating mechanism comprising indicator tabs, tab magazines and an indicator bail for raising and lowering said tabs from said magazines to visible position and return, operating mechanisms between said keys and said latter bail whereby said bail lowers said tabs at the initial movement of said keys, and indexing means operable after the initial movement of said keys and during depression of said keys to determine the indexed position of said magazines and operable thereafter and during return movement of said keys to move said magazines to the predetermined indexed position, and operating connections between said two bails.

27. A key operated cash register having depressible keys, a universal bail actuated by said keys, a key coupler controlled by said bail, indicator tabs, a pair of tab magazines for each denomination freely journaled for rocking movements, means for returning said magazines to home position at each machine operation involving a key depression in one or more denominations, means actuated by said keys for indexing the position of said magazines, and an indicator bail for raising and lowering said tabs out of and into said magazines at each operation of said machine, said latter means being controlled by said universal bail.

28. A key operated cash register having depressible keys, a universal bail actuated by said keys, a key coupler controlled by said bail, indicator tabs, a pair of tab magazines for each denomination freely journaled for rocking movements, means for returning said magazines to home position at each machine operation involving the depression of a denominational key, means under control of said universal bail for differentially positioning said magazines from home position to a new position as determined by the keys depressed, and an indicator bail controlled by said universal bail for raising and lowering said tabs out of and into said magazines at each operation of said machine.

29. A key operated cash register having depressible keys, a universal bail actuated by said keys, a key coupler controlled by said bail, indicator tabs, a pair of tab magazines for each denomination freely journaled for rocking movements, means for returning said magazines to home position at each machine operation involving the depression of a denominational key, means under control of said keys for indexing the position of said magazines from home position to a new position as determined by the keys depressed, and an indicator bail actuated by said universal bail for raising and lowering said tabs out of and into said magazines at each operation of said machine.

30. A key operated cash register having depressible keys, a universal bail actuated by said keys, indicator tabs, a pair of tab magazines for each denomination freely journaled for rocking movements, means under control of said keys for indexing the position of said magazines, a return bail actuated by said universal bail for positively returning said magazines to normal position at each operation of said machine, and an indicator bail for raising and lowering said tabs out of and into said magazines at each operation of said machine.

31. A key operated cash register having depressible keys, a universal bail actuated thereby, indicator tabs, a pair of tab magazines for each denomination freely journaled for rocking movements, means under control of said keys for indexing said magazines, a return bail actuated by said universal bail for positively returning said magazines to normal position at each operation of said machine, and an indicator bail controlled by said universal bail for raising and lowering said tabs out of and into said magazines at each operation of said machine.

32. A key operated cash register having depressible keys, a universal bail operated by said keys, a key coupler controlled by said bail and having means for latching said keys thereto, indicator tabs, means controlled by said universal bail for raising and lowering said tabs, pivoted tab magazines, means for moving said tab magazines to indexed positions in accordance with the keys depressed, a return bail actuated by said universal bail, and means operated by said latter bail for insuring positive operation of said tab magazines at each operation of said machine.

33. A key operated cash register having depressible keys, a universal bail operated by said keys during the initial portion of the key depression, differentially movable indicator tab magazines, indicator tabs therein, means controlled by said keys and operable directly upon said magazines to move the latter to indexed positions, an indicator bail for raising and lowering said tabs operable by said universal bail during the initial and final portions of key depression and key return respectively, a return bail, and means operable subsequent to the first portion of the depression of said keys to insure positive return of said tab magazines from indexed positions.

34. A key operated cash register having depressible keys, a universal bail operated by said keys during the initial portion of key depression, differentially movable indicator tab magazines, indicator tabs therein, means controlled by said keys and operable directly upon said magazines to move the latter to indexed positions, an indicator bail for raising and lowering said tabs and operable by said universal bail during the initial and final portions of key depression and key return respectively, a return bail and means operable subsequent to the first portion of the depression of said keys to insure positive return of said magazines from indexed positions, said bail remaining stationary during the final movement of said keys upon return stroke.

35. A key operated cash register having a registering mechanism, differentially movable indicator tab magazines having removable indicating tabs therein, pivoted depressible keys, a universal bail pivoted upon said key pivot and actuated by said keys through non-sliding engagements therewith, means controlled directly by said keys for actuating said register mechanism and for determining the differential positions to which the tab magazines are to be moved in accordance with the key or keys depressed, whereby those elements of said cash register which are operated with differential variations related to the values of keys depressed in operations of the machine are operated directly from said keys, a key coupler actuated by said universal bail, an indicator bail actuated by said universal bail for raising and lowering said tabs out of and into said magazines, and means controlled by said universal bail for moving said magazines to said differential positions whereby those elements of said cash register which are operated without differential variations related to the values of keys depressed in operations of the machine are controlled by said single universal bail.

36. A key operated cash register having a registering mechanism, differentially movable indicator tab magazines having removable indicating tabs therein, pivoted depressible keys, a universal bail pivoted upon said key pivot and actuated by said keys through non-sliding engagements therewith, means controlled directly by said keys for actuating said register mechanism and for determining the differential positions to which the tab magazines are to be moved in accordance with the key or keys depressed during key depression, whereby those elements of said cash register which are operated with differential variations related to the values of keys depressed in operations of the machine are operated directly from said keys, a key coupler actuated by said universal bail, an indicator bail actuated by said universal bail for lowering said tabs into said magazines, during the initial portion of key depression, and for raising said tabs out of said magazines during the final position of key return, and means controlled by said universal bail for moving said magazines to said differential positions during key return and prior to raising of said tabs whereby those elements of said cash register which are operated without differential variations related to the values of keys depressed in operations of the machine are controlled by said single universal bail.

WALTER J. PASINSKI.